United States Patent [19]

Ulmer et al.

[11] 3,866,192

[45] Feb. 11, 1975

[54] PLATED WIRE MEMORY ELEMENT

[75] Inventors: Robert P. Ulmer, Minneapolis; James O. Holmen, Minnetonka, both of Minn.

[73] Assignee: Honeywell Inc., Minneapolis, Minn.

[22] Filed: Mar. 1, 1973

[21] Appl. No.: 337,227

[52] U.S. Cl. ........ 340/174 QA, 29/196.3, 29/196.6, 340/174 NA, 340/174 PW, 340/174 TF

[51] Int. Cl. ............................................ G11c 11/14

[58] Field of Search ............340/174 PW, 174 QA, 340/174 NA; 29/196.3, 196.6

[56] References Cited

UNITED STATES PATENTS

| | | | |
|---|---|---|---|
| 3,350,180 | 10/1967 | Croll | 340/174 QA |
| 3,691,032 | 9/1972 | Luborsky et al. | 340/174 PW |
| 3,695,854 | 10/1972 | Egger et al. | 29/196.3 |
| 3,715,793 | 2/1973 | Kefalas et al. | 340/174 QA |

*Primary Examiner*—James W. Moffitt
*Attorney, Agent, or Firm*—Charles G. Mersereau

[57] ABSTRACT

An improved plated wire memory unit which exhibits an increased operating digit range while maintaining a high non-destructive readout (NDRO) limit, excellent resistance to fast read disturb and crawl disturb effects includes a non-magnetic wire substrate, a non-magnetic layer of controlled roughness overlaying the substrate, a first zero magnetostrictive magnetic layer of nickel-iron-cobalt alloy overlaying the non-magnetic layer, a thin film of controlled texture cobalt overlaying the first non-magnetostrictive magnetic layer, a thin layer of copper overlaying said cobalt layer and a final zero magnetostrictive magnetic layer of nickel-iron-cobalt alloy overlaying the copper layer.

12 Claims, 5 Drawing Figures

2 MIL WIRE
200 Å INTERMEDIATE
COBALT LAYER

PLATED WIRE MEMORY ELEMENT

CROSS-REFERENCE TO RELATED APPLICATIONS

Reference is made to two co-pending applications: one by James O. Holmen, here a co-inventor, Ser. No. 185,997, filed Oct. 4, 1971, and assigned to the same assignee; and one by James O. Holmen and Robert P. Ulmer, the co-inventors of the present application, Ser. No. 267,785, filed June 30, 1972, also assigned to the same assignee; both of which are also concerned with modified plated wire memory elements.

The first of the above-mentioned co-pending applications, Ser. No. 185,997, is concerned with depositing a thin layer of cobalt, nickel, iron or magnetic alloys of these materials beneath a final zero magnetostrictive magnetic layer of nickel-iron alloy to improve the non-destructive readout (NDRO) properties of the plated wire memory element and reduce fast burst read disturb problems.

The second related application, Ser. No. 267,785, combines the improved non-destructive readout (NDRO) properties of the thin layer of cobalt, nickel, iron or magnetic alloys of these materials with a final zero magnetostrictive magnetic layer of nickel-iron-cobalt which also greatly improves the read-write speed of the wire and overcomes the co-called "Fast Burst Read Disturb" problem.

The plated wire memory element of the present invention utilizes two separate zero magnetostrictive magnetic layers of nickel-iron-cobalt with a thin layer of controlled texture cobalt and a thin layer of copper overlaying the cobalt layer sandwiched therebetween to achieve a significant increase in the operating digit range of the wire without sacrificing any other of the desirable operating characteristics.

BACKGROUND OF THE INVENTION

Field of the Invention

The present invention is directed to a magnetic memory element of the plated wire type having an improved operating digit range.

In its simplest form the plated wire memory element consists of a non-magnetic wire substrate which is overlayed with a coating of a magnetic material.

In the process of forming the coating of magnetic material, a high magnetic anisotropy is established which favors a selected orientation in the circumferential direction. Information is then stored according to the sense of the circumferential magnetization of the plated wire. This forms the basis for binary information storage wherein the information is stored in one of the two possible magnetization directions which are normally referred to as a "one" and "zero" directions. Once stored, information is normally read out by the use of a word strap which runs orthogonal to, and envelops the plated wire. Current in the word strap produces a magnetic field along the axis of the plated wire, which, in turn, causes the magnetization vector to be displaced by some angle from its one or zero circumferential orientation, thereby causing a component of the magnetization in the circumferential direction to decrease. This causes a voltage to appear at the ends of the plated wire where it can be sensed. In order to achieve non-destructive readout, the amplitude of the word current is so controlled that the magnetization vector returns to its original position when the current is turned off.

Typical plated wire consists of a non-magnetic wire substrate which is normally made of beryllium-copper or a phosphor-bronze alloy, a non-magnetic intermediate layer of controlled roughness which is normally copper overlaying the wire substrate and a final zero magnetostrictive magnetic layer of nickel-iron alloy. Further descriptions of such prior art plated wire memory elements can be found in Richards et al. "Topography Control of Plated Wire Memory Elements", *IEEE Transactions on Magnetics*, MAG-4, (1968) and also in Mathias and Fedde, "Plated Wire Technology: A Critical Review", *IEEE Transactions on Magnetics*, MAG-5, (1969).

In addition to the problem of destructive readout associated with exceeding the permissible value of the word current in reading, destructive readout also may occur if the permissible current in the wire is exceeded during the writing or storing of an adjacent bit. During writing or storing of a bit, current is introduced both in the plated wire itself and also in the particular word strap which corresponds to the desired location of the bit. The current introduced in the plated wire is known as the "digit current", and that introduced in the word strap is known as the "word current". The coordination of these currents, then, determines the magnetization direction of the bit stored. The range of permissible values of word current introduced along the plated wire during writing or storing of a bit is known as the "operating digit range" extends from a minimum or zero point to a maximum allowable value which is known as the "unipolar digit disturb threshold" or "unipolar point" above which the remaining stored bits along the wire will be destroyed. Thus, to prevent loss of stored bits, it is highly desirable to achieve a wide operating digit range for writing or storing information in the memory as well as achieving a high NDRO limit for reading information out. Because of fluctuating temperature and other coonsiderations, the magnitude of the digit current, like that of the word current, may fluctuate from time to time even though care is taken to control this value. One of the problems associated with the prior art wires is the inability to achieve an operating digit range sufficiently broad to prevent destruction of bits in the memory because of such current fluctuations without sacrificing other desirable operating characteristics in the wire.

In the plated wire memory art, a delicate balance of interaction exists between the various laminate layers which is affected by a host of variables. In view of this, for a particular application, the proper combination is usually exceedingly difficult to develop.

Several attempts have been made in the prior art to improve the operating characteristics of plated wire memory elements. A patent to Luborsky et al. U.S. Pat. No. 3,691,032, issued Sept. 12, 1972, discloses a plated wire memory element utilizing an intermediate layer of a face centered cubic material, e.g., gold overlaying an intermediate copper layer and beneath a single permalloy layer. While such a combination may produce some increase in the NDRO limit, the limit is less than that achieved by the wire of the present invention, and little increase in the operating digit range is observed.

A second attempt which should be mentioned is found in a patent to Hideki et al. U.S. Pat. No. 3,673,581, issued June 12, 1972, which discloses the use of alternate permalloy and Co-Ni films on a Ni-P coated Cu-Ag alloy wire. While that reference does show the use of more than one permalloy layer along with an improved operating digit range, it represents an entirely different layer combination from that of the present invention. Memories using wires of the type described by Hideki et al. have been found to require far more power to operate, which excludes them entirely from use in power limited applications such as those required by most present military applications. The wire of the present invention is particularly well suited for such applications.

SUMMARY OF THE INVENTION

The present invention significantly increases the operating digit range of a plated wire memory element by a technique which markedly increases the unipolar digit disturb threshold without a similar concurrent increase in either the zero point or operating power requirements. In addition, by means of the present invention one is given the ability to control the NDRO limit with little effect on the operating digit range. Thus, the proper combination of NDRO limit and operating digit range can be combined in a given wire to achieve the best operating characteristics for a particular use.

The plated wire of the invention includes a non-magnetic wire substrate, a non-magnetic layer of controlled roughness overlaying the substrate, a first zero magnetostrictive magnetic layer of iron-nickel-cobalt overlaying the magnetic layer, a thin layer of controlled texture cobalt overlaying the first zero magnetostrictive magnetic layer, and a final zero magnetostrictive magnetic layer of iron-nickel-cobalt overlaying the cobalt layer. An additional thin layer of copper sandwiched between the first and second zero magnetostrictive magnetic layers and overlaying the cobalt layer may be added to the memory element to increase the NDRO limit and increase the resistance of the element to fast read disturb, crawl disturb, and aging effects with some reduction in the unipolar digit disturb threshold. For some applications, binary nickel-iron zero magnetostrictive magnetic layers may be substituted for the nickel-iron-cobalt zero magnetostrictive magnetic layers.

DESCRIPTION OF THE PREFERRED EMBODIMENT

Figure 3:
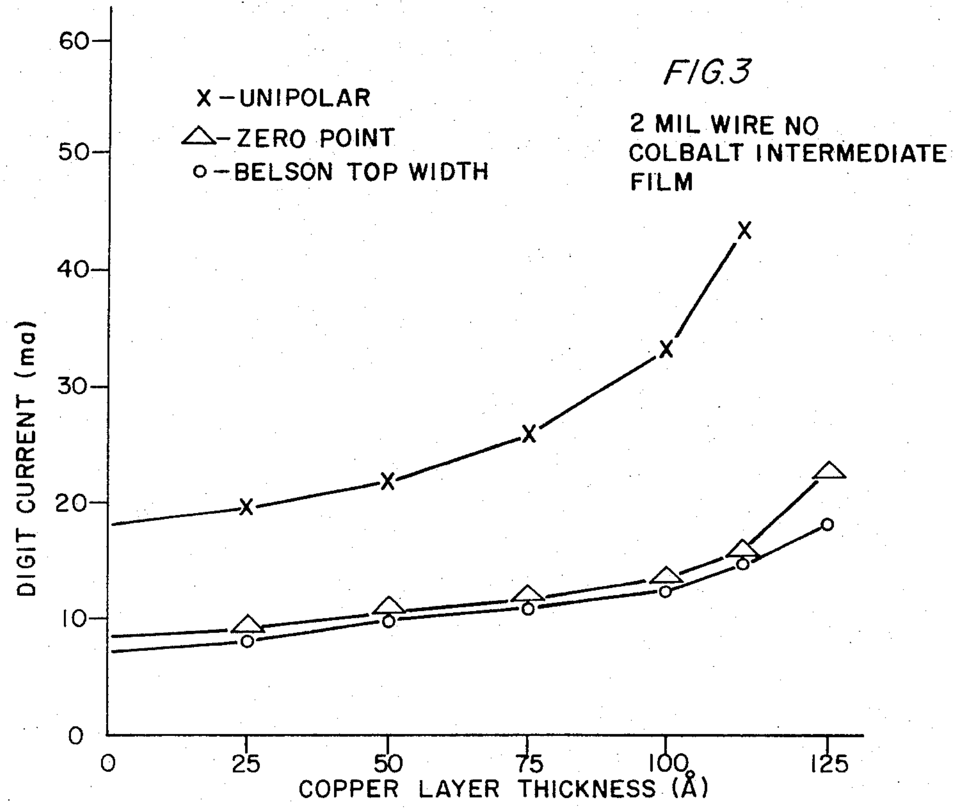
FIG. 3 is a graphical representation of digit current versus copper intermediate layer thickness showing the effect of the copper layer alone on the digit operating range and the Belson top width for 2 mil plated wire.

The plated wire memory element of the present invention is one wherein the operating digit range, along with the NDRO limit, can be successfully and predictably controlled by varying the thicknesses of intermediate layers in the laminar wire structure. This laminar structure is normally built on an inner non-magnetic wire substrate consisting normally of a beryllium-copper or phosphor-bronze alloy having a nominal diameter between about 1 mil and about 10 mils.

Overlaying the wire substrate 10 is a non-magnetic layer 11 of controlled roughness, normally copper, and having a thickness of between about $3 \times 10^3$ A and about $20 \times 10^3$ A. Other non-magnetic materials which have the requisite properties, such as gold, have been successfully used for this second layer.

In order to achieve the desired controlled roughness in the copper layer overlaying the non-magnetic wire substrate, the influence of a number of plating system variables must also be controlled. The important variables include electroplating bath temperature, pH, agitation rate, and current density. The plating cells used in producing the wire of the invention incorporate designs which produce high uniform agitation about the wire to make possible the use of higher current densities. Achieving a high uniform current density is very important to control of the copper deposit roughness. A representative copper plating bath used in producing the controlled copper roughness layer in accordance with the present invention is a pyrophosphate bath which may include the following constituents, under the following conditions:

| | |
|---|---|
| $K_4P_2O_7 \cdot 3H_2O$ | 250–350 grams/liter |
| $Cu_2P_2O_7 \cdot 3H_2O$ | 60–100 grams/liter |
| $NH_4OH$ | 4.5 milliliters/liter |
| pH = | 8.0–9.0 |
| Temp. Range | 40–60°C |
| Current Density | 600–1500 ma./cm² |

Overlaying the non-magnetic layer of controlled roughness is a first layer 12 of a zero magnetostrictive magnetic ternary iron-nickel-cobalt or binary nickel-iron alloy which is electroplated from an electrochemical bath containing organic additives in the nature of aromatic sulfonic acids and substituted compounds of aromatic sulfonic acids in a manner more fully described in the above-mentioned co-pending application Ser. No. 267,785.

A thin continuous layer of controlled texture cobalt 13 overlays the first zero magnetostrictive magnetic layer. This thin continuous layer of controlled texture cobalt normally has a thickness of from between about 150 A to about 250 A and is typically about 200 A thick. The technique normally employed in the deposition of this layer is more fully described in the above-mentioned co-pending application Ser. No. 185,997.

A further thin layer of copper 14 overlays the cobalt film to further control and enhance the roughness. As actually formed, this layer of copper is thin enough to be discontinuous appearing more in the form of "islands" of copper than as a continuous layer. This layer ranges in thickness from about 10 A to about 100 A as will be explained in greater detail below. The method of deposition of this copper layer is similar to that of the "controlled roughness" copper layer which overlays the wire substrate.

A second zero magnetostrictive magnetic layer 15 of iron-nickel-cobalt or iron-nickel overlays the thin, discontinuous copper layer. The second zero magnetostrictive magnetic layer is deposited in the same manner as the first zero magnetostrictive magnetic layer.

In connection with the two zero magnetostrictive magnetic layers 12 and 15 of the laminated structure, the percentage composition of these layers, as more fully described in the above-mentioned co-pending applications, range from about 78% to about 82% nickel and from about 18% to about 22% iron. If Cobalt is used, it may be present in an amount from about 0.1% to about 5% in the above iron-nickel combination. The total thickness of the two layers is normally between about 5000 A and about 10,000 A, which need not be split equally between the two layers. Thus, the thickness of each of the layers may vary but is usually at least 2500 A and normally varies from about 3000 A to about 4000 A.

The addition of cobalt to the nickel and iron in the zero magnetostrictive magnetic layers 12 and 15 of the plated wire memory element may be made optional. It causes an increase in the anisotropy field, $H_k$, which generally results in a higher memory element operating speed by reducing the fast burst disturb effect. However, this cobalt addition does result in some decrease in the induced output voltage; and, therefore, in systems where this output voltage is a primary consideration, cobalt may be omitted in the zero magnetostrictive magnetic layers deposited. The addition or omission of cobalt in the zero magnetostrictive magnetic layers does not appear to affect the operating digit range of the plated wire memory element, nor does it appear to affect the NDRO properties of the element.

Figure 1:
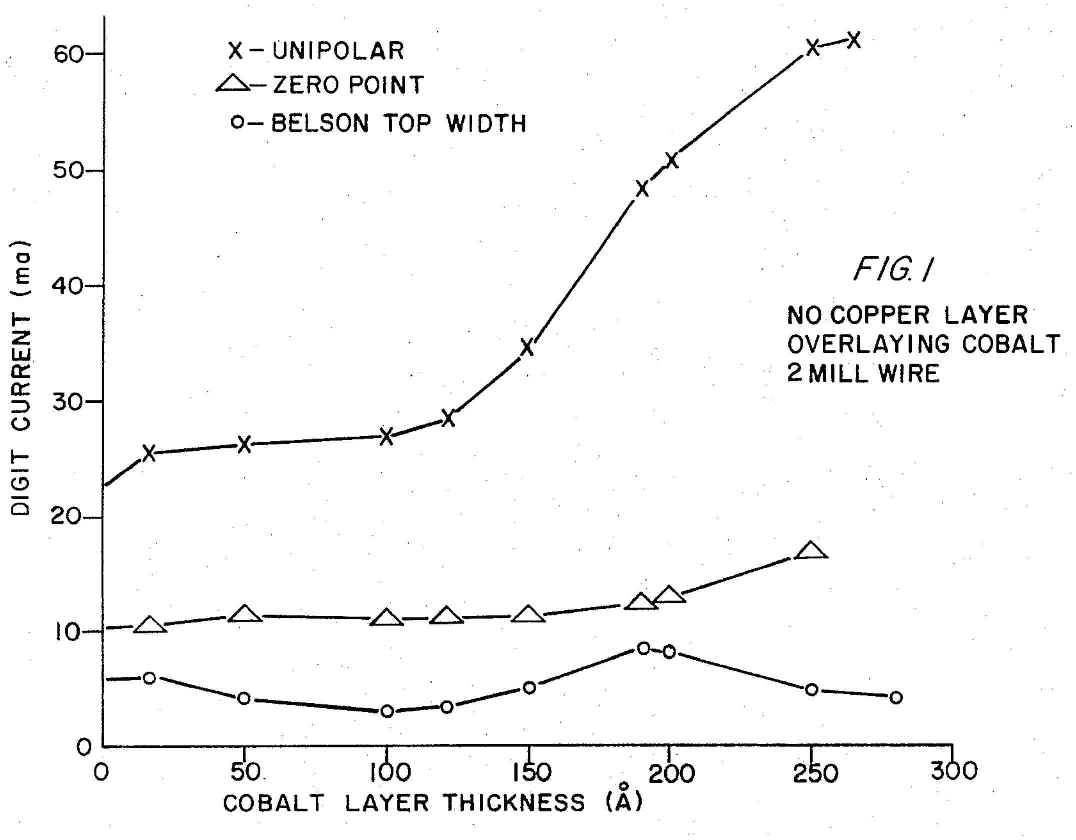
FIG. 1 is a graphical representation of digit current versus cobalt intermediate layer thickness showing the effect of the cobalt intermediate layer on digit operating range and the Belson top width for 2 mil plated wire.
Figure 2:
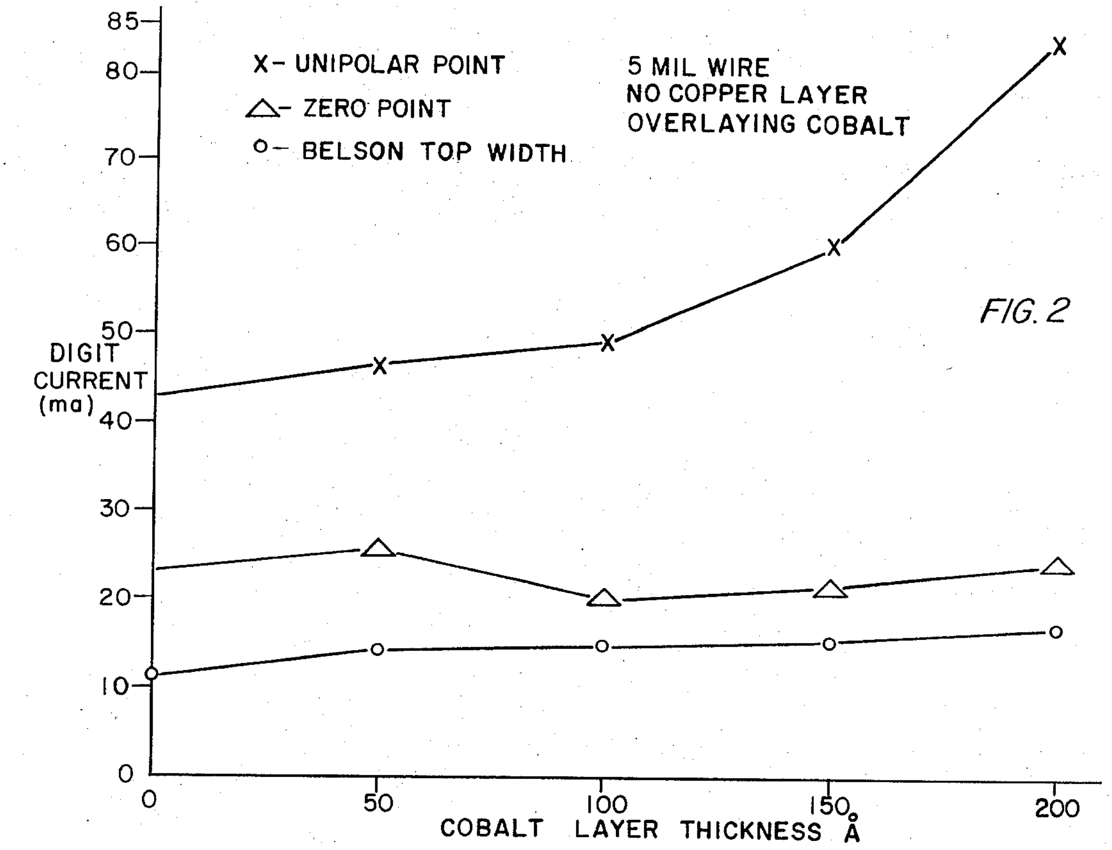
FIG. 2 is a graph similar to that of FIG. 1 for 5 mil plated wire.

An important aspect of the present invention is the control of the operating digit range of a plated wire memory element by the use of an intermediate cobalt layer between a first and second nickel-iron or nickel-iron-cobalt zero magnetostrictive magnetic layer. This intermediate cobalt layer appears to be a primary factor in producing an increased domain wall impedance which, in turn, greatly increases the unipolar digit disturb point without causing a corresponding increase in the zero point. This effect is illustrated in the graphical representations of FIGS. 1 and 2, which are curves of the applied digit current versus the thickness of the cobalt intermediate layer. As can be seen from those two figures, as the cobalt intermediate layer thickness is increased above the range of about 100 A to 125 A in thickness, the unipolar point begins to increase at a much more rpaid rate than the zero point resulting in a greatly expanded digit operating range for the wire. FIGS. 1 and 2 also illustrate that this effect is apparently independent of the original diameter of the wire substrate, as the results for both the 2 mil and the 5 mil wire are quite similar. It can also be seen from FIGS. 1 and 2 that the addition of the cobalt intermediate layer has very little effect on the Belson top width, well-known measurement related to the NDRO properties and resistance to crawl and fast read disturb effects of the plated wire. Thus, the addition of a cobalt intermediate layer having an average thickness of about 200 A increases the digit operating range for 5 mil wire from about 20 milliamps to about 60 milliamps or a factor of three. A similar layer increases the digit operating range for 2 mil wire from about 13 milliamps to about 40 milliamps which also represents an approximately threefold increase.

Turning now to FIG. 3, we see a graphical representation of the effect of adding the thin copper intermediate layer between the first and second nickel-iron or nickel-iron-cobalt layers without the addition of the above-described continuous cobalt intermediate layer. From this, we can see that the intermediate copper layer does result in some increase in the unipolar point. However, there is also a considerable offsetting increase in the zero point which greatly reduces any increase in the operating digit range for the wire. The addition of the copper layer does, however, result in an increase in the Belson top width, which indicates that it does have a beneficial effect insofar as the NDRO operation is concerned. It also produces wire which exhibits increased resistance to crawl and fast read disturb effects.

Figure 4:
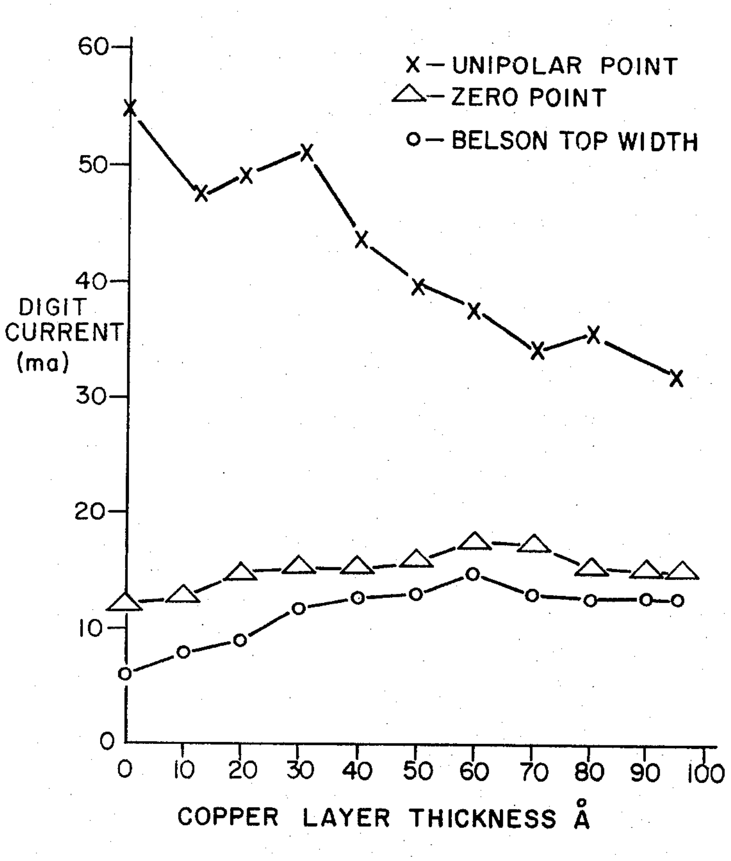
FIG. 4 is a graphical representation of digit current versus intermediate copper layer thickness for a 2 mil plated wire having a cobalt intermediate layer representing the digit operating range and the Belson top width.
Figure 5:
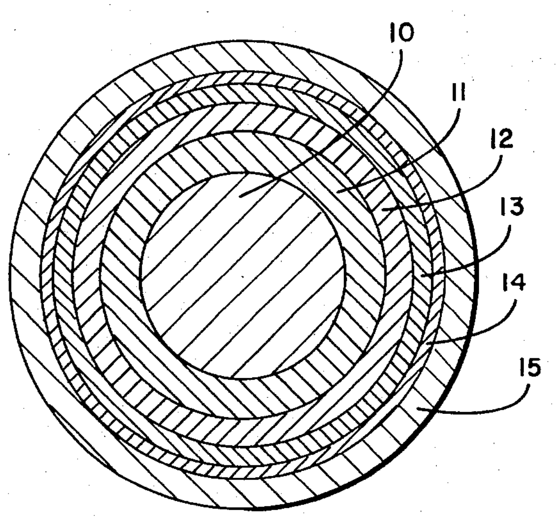
FIG. 5 is a cross-sectional view depicting the sequence of layers of the wire of the invention.

FIG. 4 illustrates the combined effects on the 2 mil wire of a 200 A intermediate cobalt layer with various thicknesses of thin copper layer overlaying the cobalt. From FIG. 4 we can see that the unipolar digit disturb threshold, while seemingly unaffected by the addition of very thin layers of copper is somewhat decreased as the thickness of th copper layer is increased above about 30 A. The Belson top width continues to increase up to an average copper layer thickness of about 60 A. At that point the digit operating range has decreased from about 40 to 45 ma to about 20 to 25 ma, but is still considersbly above that of the plated wire without the cobalt layer.

As explained above, the intermediate cobalt layer appears to be the primary factor in effecting increased domain wall impedance, which results in a greater operating digit range. The addition of the copper islands to this cobalt layer surface enhances the roughness of that surface resulting in a greater tolerance to disturb phenomena such as fast burst read disturb and crawl disturb effects. However, the unipolar digit disturb threshold is somewhat reduced by utilization of the additional copper island layer, thus reducing the operating margin somewhat. Discovery of these phenomena, however, results in a heretofore unknown flexibility in tailoring a plated wire memory element to the requirements of a specific application. Thus, in cases where wide crawl and fast read tolerances are not as critical, but wherein a high unipolar digit disturb point and wide digit operating range are necessary, the copper island layer may be eliminated from the plated wire memory element. Because the addition of the intermediate cobalt layer also significantly influences the Belson top width and increases the operating digit range of the plated wire, it may be includes in any case without detrimental effects on the desired properties.

While the foregoing description has been associated with an improved plated wire memory element having an intermediate layer of controlled texture cobalt, it is quite probable that similar effects may be obtained by substituting a layer of nickel or iron for the cobalt layer or even some magnetic combination of the three elements. In fact, early experiments have indicated some favorable results using a layer of controlled texture nickel in place of the cobalt intermediate layer.

The embodiments of the invention in which an exclusive property or right is claimed are defined as follows:

1. A plated wire memory element comprising:

a non-magnetic wire substrate, a non-magnetic layer of controlled roughness overlaying said substrate, a first zero magnetostrictive magnetic layer including nickel and iron overlaying said non-magnetic layer, thin continuous film of controlled texture cobalt overlaying said zero magnetostrictive magnetic layer, and a second zero magnetostrictive magnetic layer including nickel and iron overlaying said thin continuous layer.

2. A plated wire memory element as claimed in claim 1 wherein the total thickness of said two zero magnetostrictive magnetic layers is in range of from about 5000 A to about 10,000 A.

3. A plated wire memory element as claimed in claim 2 wherein each of said zero magnetostrictive magnetic layers is at least 2500 A thick.

4. A plated wire memory element as claimed in claim 3 wherein each of said zero magnetostrictive magnetic layers is in the range from about 3000 A to about 4000 A thick.

5. A plated wire memory element as claimed in claim 1, wherein said zero magnetostrictive magnetic layers contain from about 78% to about 82% nickel and from about 18% to about 22% iron.

6. A plated wire memory element as claimed in claim 1, wherein the zero magnetostrictive magnetic layers contain in the range from about 78% to about 82% nickel, from about 18% to about 22% iron and from about 0.1% to about 5% cobalt.

7. A plated wire memory element as claimed in claim 1 wherein said thin continuous film of controlled texture cobalt is from about 150 A to about 250 A thick.

8. A plated wire memory element as claimed in claim 1, wherein the non-magnetic wire substrate comprises a beryllium-copper alloy having a diameter from about 1 mil to about 10 mils.

9. A plated wire memory element as claimed in claim 1, wherein the non-magnetic layer of controlled roughness is copper having a thickness from about 3000 A to about 20,000 A.

10. A plated wire memory element as claimed in claim 1, further comprising a thin non-magnetic layer disposed between said thin film of controlled texture cobalt and said second layer of non-magnetostrictive magnetic material.

11. A plated wire memory element as claimed in claim 10, wherein said additional non-magnetic layer is a discontinuous layer of copper.

12. A plated wire memory element as claimed in claim 10, wherein said thin non-magnetic layer is copper having an average thickness of from about 10 A and about 100 A.

* * * * *